(12) United States Patent
Arnold et al.

(10) Patent No.: US 12,504,003 B2
(45) Date of Patent: Dec. 23, 2025

(54) WIND TURBINE AND ASSOCIATED VORTEX GENERATOR

(71) Applicant: Wobben Properties GmbH, Aurich (DE)

(72) Inventors: Matthias Arnold, Aurich (DE); Wayne White, Wilhelmshaven (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 18/448,745

(22) Filed: Aug. 11, 2023

(65) Prior Publication Data

US 2024/0052808 A1 Feb. 15, 2024

(30) Foreign Application Priority Data

Aug. 12, 2022 (EP) .................................... 22190300

(51) Int. Cl.
*F03D 13/20* (2016.01)

(52) U.S. Cl.
CPC ........ *F03D 13/201* (2023.08); *F05B 2230/60* (2013.01); *F05B 2240/122* (2013.01)

(58) Field of Classification Search
CPC .... F03D 13/201; F03D 1/0633; F03D 1/0675; F03D 80/00; F05B 2230/60; F05B 2240/122; F05B 2260/96; Y02E 10/72
See application file for complete search history.

(56) References Cited

U.S. PATENT DOCUMENTS

| | | | | | |
|---|---|---|---|---|---|
| 3,076,533 | A | * | 2/1963 | Scruton | E04H 12/28 73/147 |
| 3,581,449 | A | * | 6/1971 | Huber | E04H 12/00 52/84 |
| 4,059,129 | A | * | 11/1977 | Feis | F15D 1/10 138/40 |

(Continued)

FOREIGN PATENT DOCUMENTS

| | | |
|---|---|---|
| CN | 111043112 A | 4/2020 |
| CN | 216044200 U | 3/2022 |

(Continued)

OTHER PUBLICATIONS

Ahn KR 20150051372_English Machine Translation_Espacenet (Year: 2015).*

(Continued)

*Primary Examiner* — Nathaniel E Wiehe
*Assistant Examiner* — Wayne A Lambert
(74) *Attorney, Agent, or Firm* — Seed Intellectual Property Law Group LLP

(57) ABSTRACT

A wind turbine comprising a tower, a nacelle arranged on the tower, a generator, and a rotor comprising at least one rotor blade, wherein the wind turbine comprises vortex generators arranged on an outer surface of the tower, wherein the vortex generators have a fin extending from the outer surface of the tower, and wherein the fin has a height extending perpendicularly from the surface of the tower and a fin chord extending parallel to the surface of the tower. The fin chord has a curvature such that a first end of the fin chord has a smaller angle to the horizontal than the opposite second end of the fin chord.

18 Claims, 7 Drawing Sheets

(56) References Cited

U.S. PATENT DOCUMENTS

| | | | | |
|---|---|---|---|---|
| 4,180,369 | A | * | 12/1979 | Ottosen ............... F03D 1/00 415/908 |
| 4,193,234 | A | * | 3/1980 | Wong ............... E02B 17/00 52/84 |
| 6,019,549 | A | | 2/2000 | Blair ............... F15D 1/10 52/592.4 |
| 6,837,465 | B2 | | 1/2005 | Lisy ............... B64C 23/06 244/204.1 |
| 6,908,063 | B2 | * | 6/2005 | Bearman ............... F15D 1/12 244/199.1 |
| 7,600,945 | B2 | | 10/2009 | Burgess ............... F15D 1/12 405/211 |
| 9,476,171 | B2 | * | 10/2016 | Georgakis ............... F15D 1/10 |
| 9,476,172 | B2 | * | 10/2016 | Georgakis ............... F15D 1/10 |
| 9,494,132 | B2 | * | 11/2016 | Riddell ............... F03D 13/10 |
| 11,131,109 | B2 | * | 9/2021 | Ma ............... F03D 13/20 |
| 11,415,108 | B2 | * | 8/2022 | Ma ............... F03D 13/20 |
| 2006/0054073 | A1 | * | 3/2006 | Muehlner ............... F16L 1/123 114/243 |
| 2011/0008174 | A1 | * | 1/2011 | Ireland ............... B64C 23/06 416/223 R |
| 2011/0095135 | A1 | * | 4/2011 | Miller ............... B64C 23/06 244/200.1 |
| 2012/0257977 | A1 | * | 10/2012 | Jensen ............... F03D 1/0608 416/223 R |
| 2015/0010407 | A1 | * | 1/2015 | Zamora Rodriguez ............... F03D 1/0641 416/236 R |
| 2016/0215758 | A1 | * | 7/2016 | Corten ............... B64C 23/06 |
| 2016/0298849 | A1 | * | 10/2016 | Yang ............... F23R 3/286 |
| 2018/0202417 | A1 | * | 7/2018 | Fukami ............... F03D 1/0691 |
| 2019/0285046 | A1 | * | 9/2019 | Doosttalab ............... F03D 1/0633 |
| 2020/0002939 | A1 | * | 1/2020 | Enevoldsen ............... E04H 12/08 |
| 2020/0018285 | A1 | * | 1/2020 | Corten ............... F03D 3/062 |
| 2020/0056593 | A1 | * | 2/2020 | Jensen ............... E04H 12/00 |

FOREIGN PATENT DOCUMENTS

| | | | | |
|---|---|---|---|---|
| DE | 2606479 | A1 | | 8/1976 |
| DE | 202010002845 | U1 | | 8/2010 |
| EP | 3565967 | A1 | | 11/2019 |
| EP | 3604715 | A1 | | 2/2020 |
| EP | 4202208 | A1 | * | 6/2023 ............ F03D 13/20 |
| GB | 2362938 | A | * | 12/2001 ............ F15D 1/12 |
| KR | 20150051372 | A | * | 5/2015 |
| WO | WO-2015030573 | A1 | * | 3/2015 ............ B64C 23/06 |
| WO | WO 2018149527 | A1 | | 8/2018 |

OTHER PUBLICATIONS

Song et al. CN 111043112_English Machine Translation_Espacenet (Year: 2020).*

* cited by examiner

WIND TURBINE AND ASSOCIATED VORTEX GENERATOR

BACKGROUND

Technical Field

The present invention relates to a wind turbine comprising a tower, a nacelle arranged on the tower, a generator, and a rotor comprising at least one rotor blade, wherein the wind turbine has vortex generators arranged on an outer surface of the tower, wherein the vortex generators have a fin extending from the outer surface of the tower, wherein the fin has a height extending perpendicularly from the surface of the tower and a fin chord extending parallel to the surface of the tower. The invention also relates to an associated vortex generator and to an associated method. In particular, the invention relates to the arrangement of the vortex generators.

Description of the Related Art

Wind turbines, in particular horizontal axis wind turbines, are widely known and are used to generate electrical energy from wind. Periodic vortex shedding at a tower of the wind turbine leads to an excitation of the tower. If this coincides with a natural frequency of the tower structure, depending on the wind speed, vortex-induced vibrations (ViV)/vortex-excited transverse vibrations can occur. These pose an obstacle to the further construction of the tower, as well as a structural risk and work safety risk.

To solve the ViV problem, it has been proposed to use temporarily attached "Scruton helixes." These are helical disturbance bodies (e.g., drainage pipes, foam bodies, hoses) attached around the tower. However, this solution requires a relatively large amount of time to attach these bodies and will typically only be used for the top tower section due to the removal required after assembly.

For example, it is known from EP 3 565 967 A1 that a tower of a wind turbine has an outer surface, wherein a vortex generator is connected to the outer surface of the building structure, which is designed and arranged to generate vortices in an air stream passing by the outer surface.

However, the large-scale occupancy of the surface by vortex generators proposed therein has proven to be very complex and thus costly.

Alternative solutions for combating vortex-induced vibrations are known, for example, from EP 3 604 715 A1.

BRIEF SUMMARY

Against this background, the present disclosure improves the wind turbine, in particular the vortex generators arranged thereon, in such a manner that the solution of the ViV problem is improved, in particular solved with less effort and/or a considerably reduced amount of vortex generators and thus lower costs.

According to one aspect, the wind turbine described at the beginning is improved in that the fin chord of the vortex generator has a curvature such that a first end of the fin chord has a smaller angle to the horizontal than the opposite second end of the fin chord.

A vortex generator comprises a fin, a wing-like geometry that generates a lift in a present airflow. It is preferred that the fin is a thin or "flat" structure, i.e., the fin has normal to the tower wall an extension in chord or length direction that is substantially, e.g. two times or more, preferred five times or more, longer than an extension in a thickness direction normal to the chord or length direction. Both the length direction and the thickness direction are normal to the tower surface. The material of the vortex generator is preferably UV resistant, for instance plastic, metal or coated in UV resistant, and in some examples is provided in a light color in order to prevent heating.

The fin chord is preferably of curvilinear shape in a direction substantially normal to its height direction, i.e., in a plane parallel to the surface of the tower, with a length of the curvilinear shape being significantly larger than a width. Significantly larger in this context corresponds to at least two times, preferably at least five times and particularly preferably at least ten times larger. In this case, the fin chord corresponds to the extension along the length direction of the curvilinear shape, which is curved or cambered.

In other embodiments, the fin comprises an aerodynamic shape or profile in the direction substantially normal to its height direction. In such examples, the fin chord corresponds to a line connecting the center points of the width of the fin. The fin chord may therefore be understood as a camber line of the aerodynamic shape or profile of the fin. It is preferred that the curvature of the fin chord is determined in a height of 10% of the maximum height of the fin of the vortex generator.

Thus, the fin of the vortex generator corresponds to a cambered airfoil arranged substantially normal to the tower surface. A change in camber value of the fin may be used as a measure of the curvature of the fin. In other words, the curvature of the fin chord may be derived as a derivative of the camber value in the direction of the fin chord.

A mean camber line is an imaginary line which lies halfway between the upper surface and lower surface of the fin and meets at the fin leading edge and fin trailing edge. But between the fin leading edge and the fin trailing edge the camber line can curve above or below the direct connection between fin leading edge and fin trailing edge. The camber value specified here gives the highest value above or below the direct connection between fin leading edge and fin trailing edge divided by the distance between fin leading edge and fin trailing edge.

Preferentially, the camber value of the fin chord or fin airfoil is at least 1%, further preferentially at least 2% and most preferably at least 3%.

The vortex generators are shaped in such a manner that they generate a strong vortex pair in the case of a nominal incident flow, while they generate no vortex pair or a weak vortex pair in the case of a rearward incident flow. This is precisely the effect of the curvature of the fin chord of the vortex generator. Here, the nominal incident flow is in particular the direction from the first end of the fin chord to the second end of the fin chord, wherein the rearward incident flow is directed from the second end towards the first end.

It is utilized here that the air flow flowing past the tower is predominantly horizontally oriented. Of course, there can also be vertical components of this air flow, but they do not affect the effect, namely the asymmetrically strong generation of vortex pairs. The generation of a strong and weak vortex pair results from the different angles to the horizontal, since in particular the increase of the angle across the fin chord, i.e., in the direction of the nominal incident flow, deflects the air flow from the horizontal and thus causes a strong vortex, whereas the opposite direction does not show this effect so that the vortex generated is weaker.

The efficiency of the vortex generators can be indicated by a quality parameter which relates the maximum vorticity in the wake of the vortex generator at a nominal incident flow to the maximum vorticity in the wake of the vortex generator at a reverse, i.e., rearward, incident flow. Preferably, the quality parameter is at least 1.5, particularly preferably at least 2. The maximum vorticity is also referred to as vorticity in the literature.

In contrast to a kink in the course of the fin chord, a curvature has the effect that the air flow does not experience discontinuities, which are disadvantageous for several reasons. At the same time, however, the angle at which the air is incident on the fin chord can be different due to the different angles to the horizontal for nominal and rearward incident flow, which produces the advantageous effect.

Preferably, the difference between the angle of the first end to the horizontal and the angle of the second end to the horizontal is at least 5°, particularly preferably at least 10°. Likewise, it is preferred that the difference between the angles is at most 60°, and particularly preferably at most 45°.

Preferably, the curvature of the fin chord is not equal to 0 over its entire course. This results in a particularly advantageous asymmetry of the generated vortices as a function of the inflow direction. The curvature can be constant over the entire fin chord. However, the curvature can also be different, for example greater near one or both of the ends than in a central region.

Preferably, the fins extend at an angle of at least 80°, preferably at least 85°, particularly preferably at least 88°, to the outer surface.

It has been found that, in particular in terms of production technology, the extent perpendicular to the outer surface is advantageous. This makes it particularly easy to demold, for example if the vortex generators are produced using an injection molding process. Aerodynamically, deviations from the perpendicular extent are also possible without disadvantages.

A bottom surface of the vortex generator, with which the vortex generator is mounted to the tower, is preferentially curved in order to improve the fit to the curvature of the tower. However, since the curvature of the tower varies with height or varies between different towers, it is preferred to connect the vortex generator to the tower by an adhesive, more preferred an adhesive tape, in specific an adhesive foam tape.

The thickness of the adhesive is preferably between 1 mm and 4 mm, in specific 2 mm, in order to compensate any potential deviations of the curvature of the vortex generator from the curvature of the tower at the respective location on the outer surface of the tower. The thickness of the adhesive also enables mounting of vortex generators with the previously described curvature of the bottom surface on flat outer surfaces of the tower, comprising no curvature. This is especially useful with towers of wind turbines that comprise a polygon shape instead of a cylindrical shape.

The fin preferably comprises a round edge without any corners in its height direction, in order to, for example, prevent damaging ropes of maintenance workers.

Preferably, the fins of each of the vortex generators have a height of between 0.5% and 5%, preferably between 1% and 2.5%, and particularly preferably about 1.5%, of the diameter of the tower at the location of the vortex generator.

For example, it has been found that a fin height of about 64 mm is ideal for a tower that has a diameter of 4 m there. The tower diameter over the height is typically not constant, and it is preferred that the same vortex generators are attached at least over a certain height range of the tower, as this provides simplifications in terms of production technology. In this context, the word "about" is preferably understood to mean a range of +/−20% around the stated value, in this case 1.5% based on the diameter of the tower.

As a minimum height of the fins, 32 mm have proved to be suitable. In particular, 32 mm has proved to be an advantageous minimum height for a tower of 4 m diameter.

In one embodiment, multiple vortex generators, preferably a number of vortex generators divisible by four, greater than six and in particular eight vortex generators, are arranged annularly in a plane around the tower. A multiple of four has the particular advantage that this means that the vortex generators do not violate the maximum height and maximum width of the transport in the transport of the usually round tower segment. During transport, the vortex generators are then positioned obliquely upwards or downwards.

In this context, a plane is understood to mean a kind of step in the height direction of the tower and is used in particular to distinguish it from helical arrangements. In fact, it has been found that the arrangement substantially in ring form is advantageous over the helical arrangement.

However, it is preferred that the multiple vortex generators are arranged in a way that there is at least one way of placing the tower or respective parts of the tower comprising vortex generators on its outer surface on a transport without extending the height of the same transport carrying the same tower or part of the tower without vortex generators on its outer surface.

Accordingly, a plane is a height range or height step along which the vortex generators are arranged annularly around the tower. Here, all vortex generators can be located at exactly the same height position, or alternatively alternately offset within the ring in the form of a zigzag curve. For example, in each case one vortex generator can be offset upwards and the adjacent one downwards. Such an alternating arrangement within a ring has been found to be particularly advantageous.

Preferably, the vortex generators are evenly spaced from each other in a plane.

In other embodiments, the vortex generators are unevenly spaced from each other in the plane.

In particular, the height of the vortex generators add up to the overall height of the tower upon transportation, wherein the tower is transported lying down or horizontally. In this embodiment, the arrangement of the vortex generators is displaced around the tower circumference from the evenly spaced positions to avoid exceeding a maximum allowable height for transportation.

For example, if eight vortex generators are arranged annularly at a distance of 45° around the tower, vortex generators may be located at −22.5° or +22.5° at even distribution. Those two vortex generator locations would correspond to the highest position on the tower during transport. In this example, these vortex generators could be shifted to −30° or +30°, i.e., to a lower position, for instance. The effect is that the overall height of the tower with vortex generators during transport is reduced and the height restrictions may be complied with.

Preferably, multiple planes or rings of vortex generators are arranged along the height direction of the tower. For example, two, three, four, or more than four planes or rings of vortex generators are arranged. The planes or rings can each have the same number of vortex generators, but they can also have different numbers of vortex generators. Also, the vortex generators of the different planes or rings can be arranged at the same position in the circumferential direction or offset from each other in the circumferential direction.

In a preferred embodiment, the multiple planes have a distance from each other in the vertical direction that is between one and three times the tower diameter, preferably about two times the tower diameter.

Here, the distance between single and triple the tower diameter is the advantageous compromise between effectiveness and complexity, wherein a higher number of planes or rings increases complexity and expense, while a lower number worsens effectiveness.

Preferably, at least three planes of vortex generators are arranged along the height direction of the planes levels. In this case, one can also speak of multiple rings, which have a significantly smaller distance than to the next plane or ring.

In a preferred embodiment, the curvatures of the fin chords of all of the vortex generators of a plane are oriented the same. In other words, the orientation of the individual vortex generators in the circumferential direction is the same in this preferred configuration. In this case, a part of the plane or ring of vortex generators is thus always subjected to incident flow in the nominal direction, while another part of the plane is subjected to a rearward flow.

Thus, there is a permanent difference between strong vortices, namely on the side of incident flow in nominal direction, and weaker vortices, namely on the side of flow in rearward direction, of the plane or ring of vortex generators.

In a preferred configuration, the curvatures of the fin chords of at least two adjacent planes, preferably all of the adjacent planes, are oppositely oriented.

This results in the situation that two planes or rings of vortex generators adjacent in vertical direction are not subjected simultaneously to a flow in nominal and rearward direction, respectively. If a flow is incident in the nominal direction on a certain part in the circumferential direction of a first plane, and the adjacent planes are curved in the opposite direction, then the adjacent planes are subjected to a straight rearward flow. This results in an advantageous difference in the generated vortices between the planes adjacent in the vertical direction. Accordingly, on the opposite side of the tower, the first plane is subjected to a rearward flow, while the adjacent planes are then subjected to a nominal flow.

In a preferred configuration, the fin chord has a curvature such that the vortex generator allows deflection of the flow passing the surface of the tower in the transverse direction of the tower. This is an advantageous secondary effect of the arrangement of vortex generators.

In a preferred embodiment, the vortex generators each have two fins with a base arranged therebetween.

Thus, the vortex generators are formed as a pair of vortex generators. The base arranged therebetween allows the vortex generators to be mounted to the wind turbine with minimal effort. In addition, the stability of the attachment of the vortex generators to the tower of the wind turbine is increased.

At least one of the two fins has the curved fin chord, wherein it is also possible that both of the fins can have correspondingly curved fin chords.

Preferably, the distance between the fins is approximately equal to the height of the fins, wherein here, for example, the largest distance or the largest height is used in each case.

In a preferred configuration, the two fins of the vortex generator have opposite curvatures, so that tangents through the first ends of the two fins do not intersect or intersect at a smaller angle than tangents through the opposite second ends of the two fins.

In particular, this means that the two fins are approximately parallel at the first ends, while the fins approach each other or move away from each other at the second ends. It has been found to be particularly advantageous to design the vortex generators in such a manner that the two fins converge towards each other at the second ends.

Preferably, the vortex generators are mounted on the outer surface of the tower such that a centerline between the two fins extends substantially horizontal.

This allows for a maximum difference between nominal incident flow and reverse or rearward incident flow of the pair of fins of a vortex generator for most prevailing wind conditions, particularly those without significant vertical components. The term "substantially" is preferably used herein to include a manufacturing tolerance, for example in the range of 10°, preferably 5°.

Preferably, the centerline for all vortex generators of all planes of vortex generators is substantially horizontal, wherein the orientation of the vortex generators is preferably opposite for adjacent planes.

In a preferred embodiment, a front half along the fin chord of a lateral surface of the fins, starting from the first end, is smaller than a rear half of the surface, in particular at least 50% and particularly preferably at least 75% of the rear half of the fin chord of the surface.

Thus, this embodiment specifies the lateral surface of the fins of the vortex generators, which, specifically in the longitudinal direction of the fin chord, should not be designed to be symmetrical, but asymmetrical. Here, the front half in the fin chord direction is to be smaller than the rear half, wherein "front" is referred to as the first end. It has been found that such a geometry provides a particularly good imbalance between vortex strengths at nominal and reverse incident flow.

Preferably, the base has at most 90% of the surface between the fin chords of the fins, wherein in the base is in particular "U"-, "V"-, "W-" or "H"-shaped. Such a base provides stability against detachment, saves material, and provides an additional aerodynamic effect due to the edges of the base which are not perpendicular to the direction of flow.

Preferably, the vortex generators are arranged such that the flow deflection is substantially independent of the wind direction. Thus, the advantageous effect of avoiding ViV can be achieved regardless of the wind direction and at all operating conditions. This can be achieved, for example, by the unidirectional vortex generators in each plane.

In another aspect, the disclosure relates to a vortex generator for use in a wind turbine, for example a wind turbine according to an aspect of the present disclosure.

In yet another aspect, the disclosure relates to a method of retrofitting vortex generators.

BRIEF DESCRIPTION OF THE SEVERAL VIEWS OF THE DRAWINGS

Further advantages and preferred configurations are further described below with reference to the accompanying figures. In the figures.

DETAILED DESCRIPTION

Figure 1:
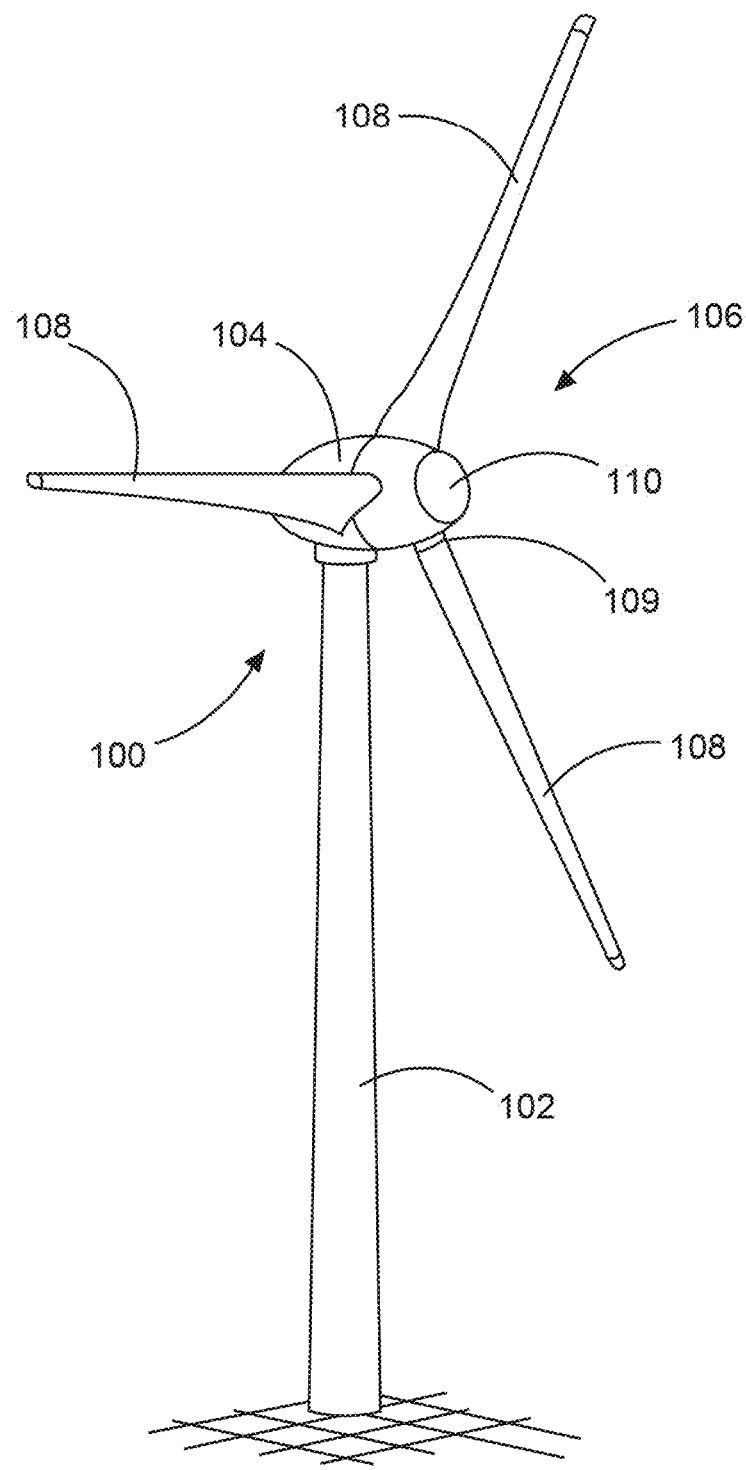
FIG. 1 shows schematically and exemplarily a wind turbine.

FIG. 1 shows a schematic illustration of a wind turbine according to the disclosure. The wind turbine 100 includes a tower 102 and a nacelle 104 on the tower 102. An aerodynamic rotor 106 having three rotor blades 108 and a spinner 110 is provided on the nacelle 104. The aerodynamic rotor 106 is set in rotation by the wind during operation of the wind turbine and thus also rotates an electrodynamic rotor or rotor of a generator that is directly or indirectly coupled to the aerodynamic rotor 106. The electrical generator is located in the nacelle 104 and generates electrical power. The pitch angles of the rotor blades 108 can be varied by pitch motors at the rotor blade roots 109 of the respective rotor blades 108.

Figure 2:
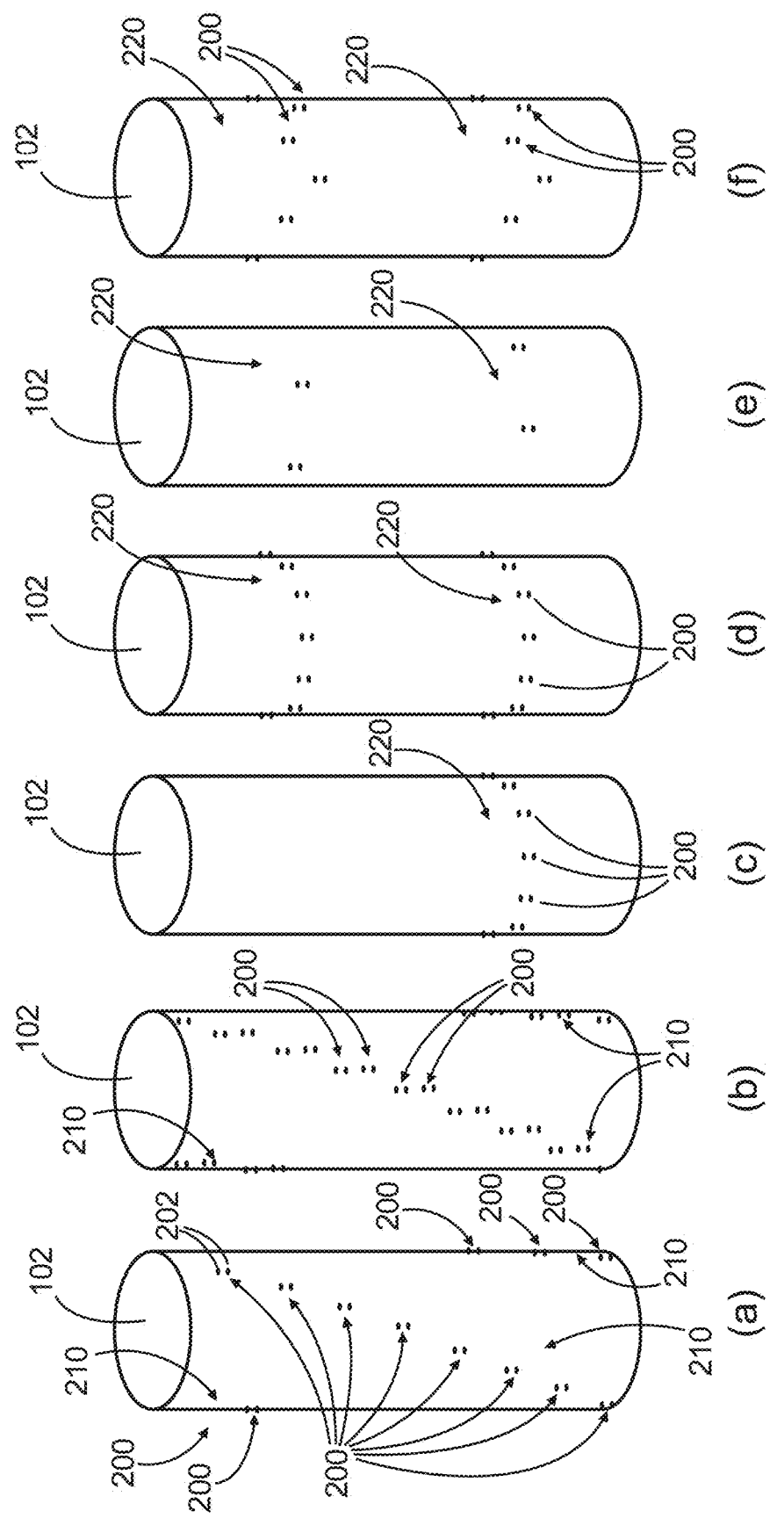
FIG. 2 shows schematically and exemplarily the arrangement of vortex generators on a tower of the wind turbine.

FIG. 2 shows various arrangements of vortex generators 200 on the outside of the tower 102 of the wind turbine 100. In FIG. 2, only a portion of each of the respective towers 102 is shown in the vertical direction; thus, in the vertical direction, the tower 102 can extend further at the lower end as well as at the upper end.

The vortex generators 200 each have two pairs of oppositely curved fins 202 and are described in detail with reference to FIG. 3, for example. This provides the vortex generator 200 with a nominal incident flow direction and a reverse or rearward incident flow direction, wherein the vortex generators 200 are arranged on the tower 102 such that both the nominal incident flow direction and the rearward incident flow direction, rotated by 180°, are substantially horizontal.

FIG. 2(a) shows a helical arrangement of vortex generators 200 on the tower 102. Shown is one vortex generator 200 per step in the circumferential direction.

While a right-handed helix with three helix strands 210 is shown in the example, left-handed helices are of course equally possible. Also, although a triple helix is shown, more and fewer helix strands are of course also conceivable.

FIG. 2(b) also shows a helical arrangement of vortex generators 200, wherein two vortex generators 200 are arranged vertically one above the other at one position in the circumferential direction.

In FIG. 2(a) and FIG. 2(b), vertically adjacent vortex generators 200 arranged in a helical strand can have either the same or an opposite orientation, with the same orientation of all vortex generators 200 in a helical strand being preferred.

FIG. 2(c) shows a circumferential plane 220 or ring of vortex generators 200. In this example, horizontally adjacent vortex generators 200 can be arranged in the same or opposite orientation.

Preferably, vortex generators 200 arranged vertically adjacent are different and vortex generators 200 arranged horizontally adjacent are the same.

FIG. 2(d) shows two planes 220, wherein the vortex generators 200 of the lower plane are arranged at the same position in the circumferential direction as the vortex generators 200 of the upper plane. Of course, more than two planes 220 are also conceivable. The vertically adjacent vortex generators 200 of the different planes can also be arranged in the same or opposite orientation. The distances of the planes to each other can vary and form, for example, a double or multi ring over a large distance and one or more small distances.

FIG. 2(e) shows another example with two planes 220, wherein the occupancy rate of vortex generators 200 per plane 220 is lower than in the example of FIG. 2(d). In addition, the vortex generators 200 of the different planes are each arranged with offset in the circumferential direction. An occupancy of more or less than the vortex generators 200 shown per plane 220 is also possible.

Finally, FIG. 2(f) shows an example in which horizontally adjacent vortex generators 200 are arranged alternately offset upwards and downwards with respect to plane 220. Here, the vortex generators 200 also extend annularly around the tower 102, but the vertical position of the respective vortex generators 200 is not identical but alternates in the manner of a sinusoidal shape.

Figure 3:
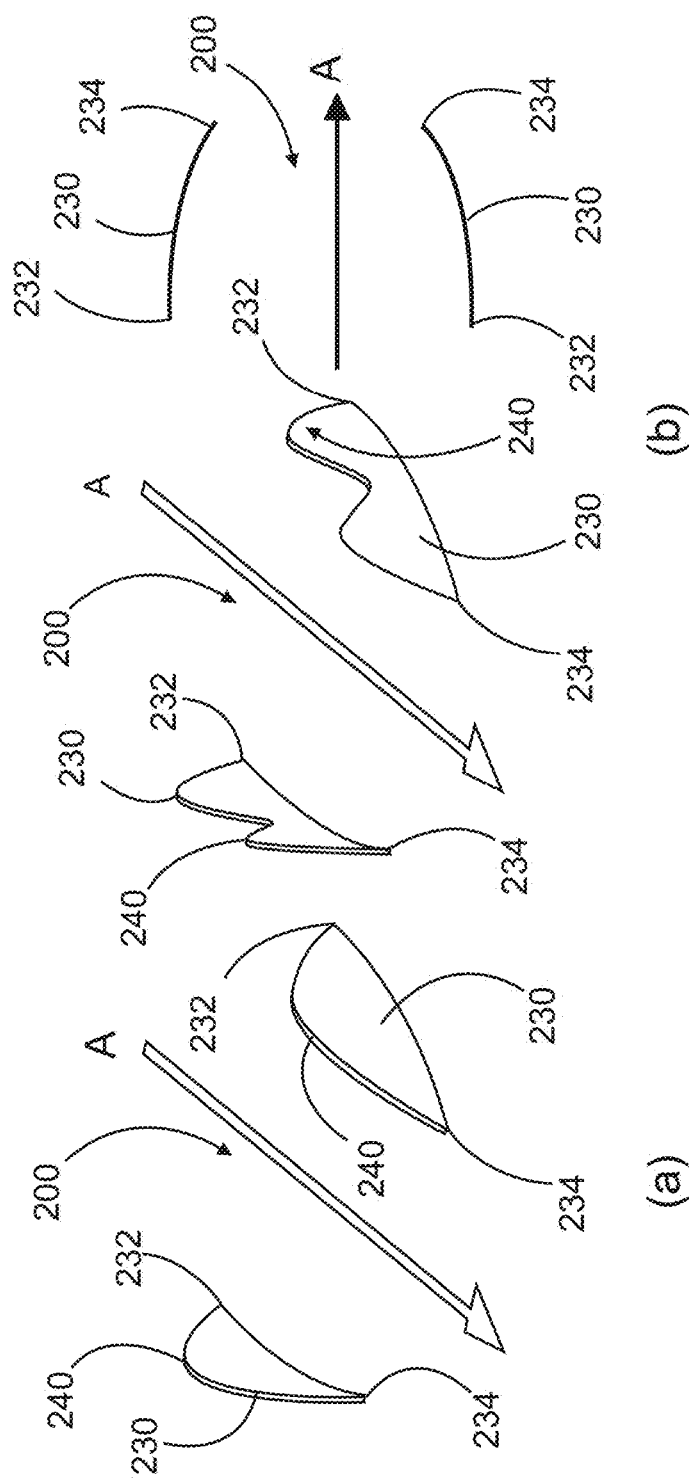
FIG. 3 shows schematically and exemplarily further details of the vortex generators.

FIG. 3 shows further details of the vortex generators 200. The vortex generators 200 are shaped such that they generate a strong vortex pair at a nominal incident flow A, while they generate no vortex pair or a weak vortex pair at a rearward incident flow (not shown, opposite to the incident flow A).

This is achieved by cambering a fin 230 of the vortex generator 200. In the example shown, two fins 230 formed in pairs on a vortex generator 200 have an oppositely directed camber. The respective fins 230 include a fin chord extending from a first end 232 to a second end 234. The nominal incident flow takes place from the first end 232 towards the second end 234, wherein the rearward incident flow takes place in the exact opposite direction from the second end 234 towards the first end 232.

The fin chord of the fin 230 is curved, resulting in a curved airfoil. The first end 232 has a smaller angle to the incident flow direction than the second end 234, with the two fins 230 of the vortex generator 200 converging from the first ends 232 to the second ends 234 in the example shown in FIG. 3.

In side view, the fins 230 are preferably not rectangular or triangular like classical vortex generators, but have a rounded contour with one, cf., FIG. 3(a), or more, cf., FIG. 3(b), rounded tips 240. The asymmetry between pairs of generated vortices is particularly pronounced in the case of nominal and opposite incident flow in the case of the formation with multiple tips (cf., camel humps).

In the illustrated example of FIG. 3(b) the curvature along the fin chord of the fin 230 between first end 232 and second end 234 is substantially constant. In other examples, the curvature may be different in different sections of the fin 230, for instance the fin 230 may be strongly curved in a central region and comprise straight or almost straight sections with less curvature than the central region near the first end 232 and/or second end 234, respectively.

The occupancy of the tower 102 by vortex generators 200 is oriented towards the range of greatest amplitude for the respective natural mode. For the $1^{st}$ mode correspondingly approximately the uppermost ⅓ of the tower, for the $2^{nd}$ mode in the region of half the tower height.

With an elaborate almost full-surface occupancy of the tower by vortex generators, it is achieved that the wake width of the tower is reduced on both sides and thus no pronounced vortex instability and corresponding excitation of the tower occurs. In contrast, the present disclosure influences the wake of the tower only in individual heights or sections on half sides.

Figure 4:
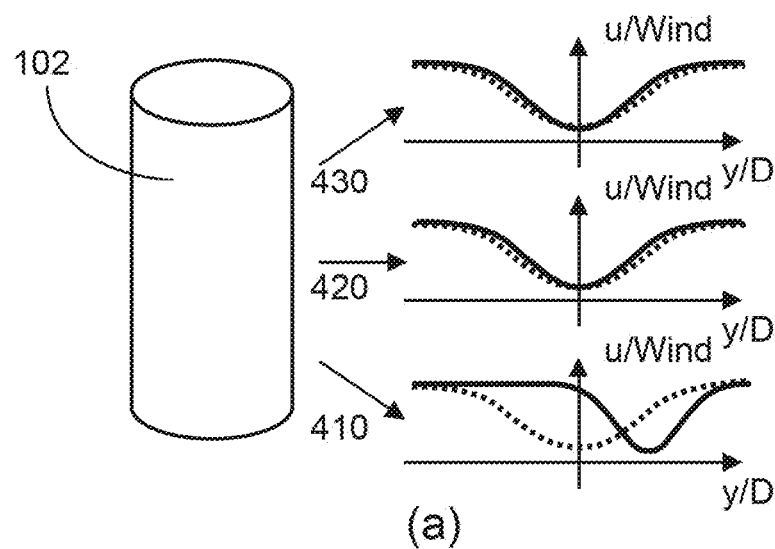
FIG. 4 shows schematically and exemplarily an effect of the arrangement of vortex generators according to an embodiment of the disclosure.
Figure 4:
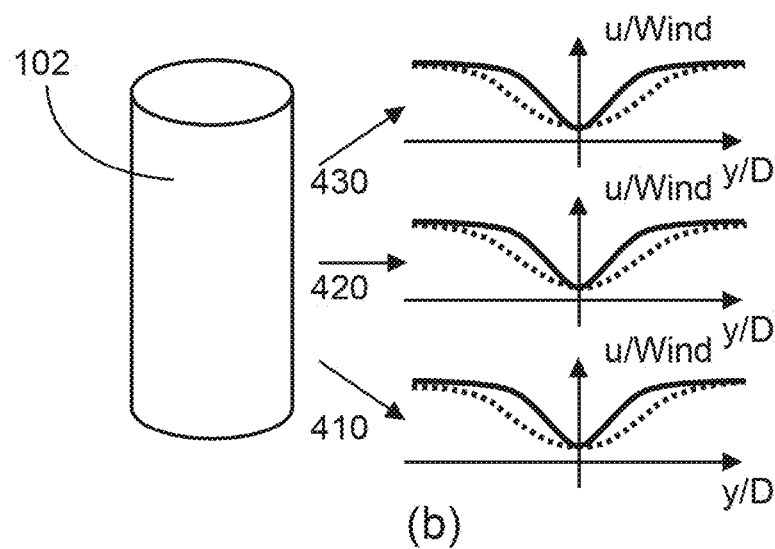

This results in two advantageous effects, which are described with reference to FIG. 4. FIG. 4 shows a comparison of the present disclosure in FIG. 4(a) and the known full-surface occupancy of tower 102 with vortex generators in FIG. 4(b). The figure shows the influence of the vortex generators 200 on the flow around the tower at different tower heights. In FIG. 4(a), only one row of vortex generators 200 is shown with a camber in the lower region 410, while in FIG. 4(b), vortex generators 200 are formed without camber in the lower region 410, in the middle region 420, and in the upper region 430.

The dashed lines show the flow around the tower in the case of a bare cylinder, as which the tower 102 is approximated here for simplicity, while the solid lines show the course with the described arrangement of vortex generators.

According to the disclosure, on the one hand, the wake in the influenced regions, here the lower region 410, is deflected laterally by the asymmetry of the flow around tower so that the wake regions along the tower 102 are split from each other and no synchronous separation can occur along the tower. This can be seen in the fact that the solid line in the region 410 in FIG. 4(a) is not symmetrical with respect to the center. This allows the distance between two regions occupied by vortex generators to increase in the vertical direction up to the stall cluster size range. This corresponds to the physical effect of the "dog-tooth" geometry, which is used on delta wings of jets, for example.

Figure 5:
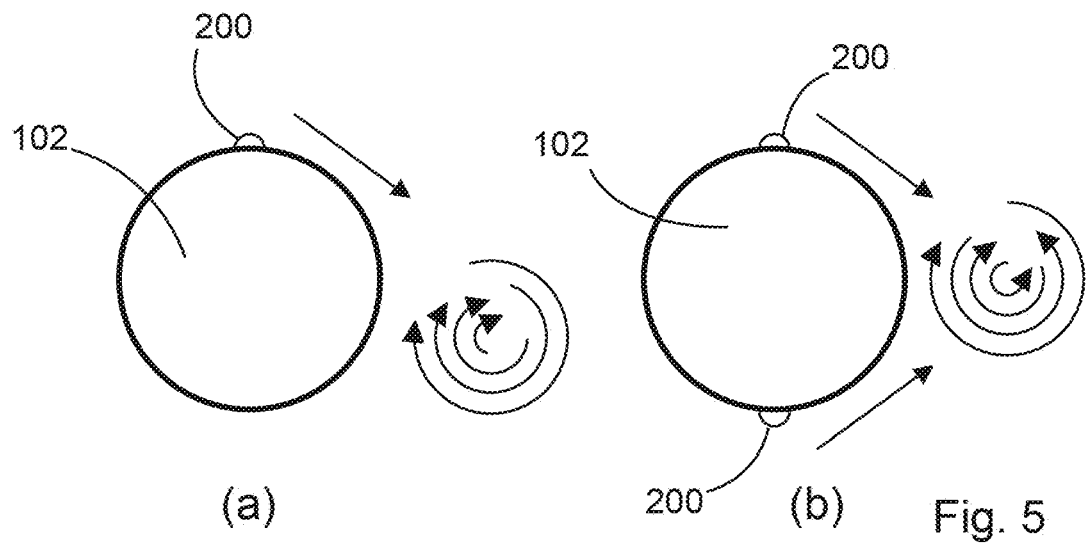
FIG. 5 shows schematically and exemplarily a further effect of the arrangement of vortex generators according to an embodiment of the disclosure.

On the other hand, as a second effect, the asymmetrically strong wake vortices of the vortex generators cause the central wake vortex in the near-field of the tower to rotate in a preferred direction of rotation, FIG. 5(a), while it oscillates undisturbed or in known arrangements in its direction of rotation, as shown schematically and exemplarily in FIG. 5(b). It should be noted here that the asymmetrically strong wake vortices in FIG. 5(a) are shown schematically in that the vortex generator 200 is arranged only on one side of the tower 102. Any vortex generator 200 possibly present on the opposite side and subjected to a flow in the opposite direction to the nominal incident flow direction is omitted to simplify the illustration. The results of this is that with the present disclosure, when a wake instability occurs, it can only form an oscillation at a greater distance from the surface and thus lower alternating loads occur on the tower 102.

The result of the two effects described is that no dominant frequency can form in the vortex street and no resonance is created between the tower 102 and the flow. To achieve this, it is particularly effective to have regions along the tower 102 that are occupied by "active" vortex generators 200 and regions where this is not the case. Vortex generators 200 are referred to as "active" if they are subjected to flow in the nominal incident flow direction, while those which are subjected to a flow in the opposite direction are not "active". In particular, "active" vortex generators 200 at the same height along the tower must be present only on one of the two sides.

Here, a helical arrangement takes advantage of the fact that vortex generators 200 located in the region of the stagnation point or wake separation are not subjected to a flow flowing around them and thus cannot generate any corresponding vortex pairs. Depending on the wind direction, a different height of the tower 102 is affected or "active" in this case. In contrast, for an annular arrangement, the influenced height is always at the same position and the intermediate heights are left free. In both cases, the number of vortex generators over the circumference of the tower is preferably to be selected such that at least one vortex generator 200 is always in the relevant "active" flow region.

Furthermore, it is particularly preferred for the disclosure that the vortex generators 200 do not generate a pronounced vortex pair in the case of a rearward incident flow. This is achieved by cambering the fins so that, in plan view, the fins or the flow around them results in a part of a recumbent U or an opening tulip. In this case, if the vortex generator 200 is subjected to nominal incident flow on the main flow-parallel region, the regions of the vortex generator 200 set up on the leeward side create a vortex pair. If, on the other hand, the vortex generator 200 is subjected to a flow from the rear, the regions now located on the windward side initially generate a vortex pair, which is then compensated for by the main flow-parallel region now located on the leeward side.

Figure 6:
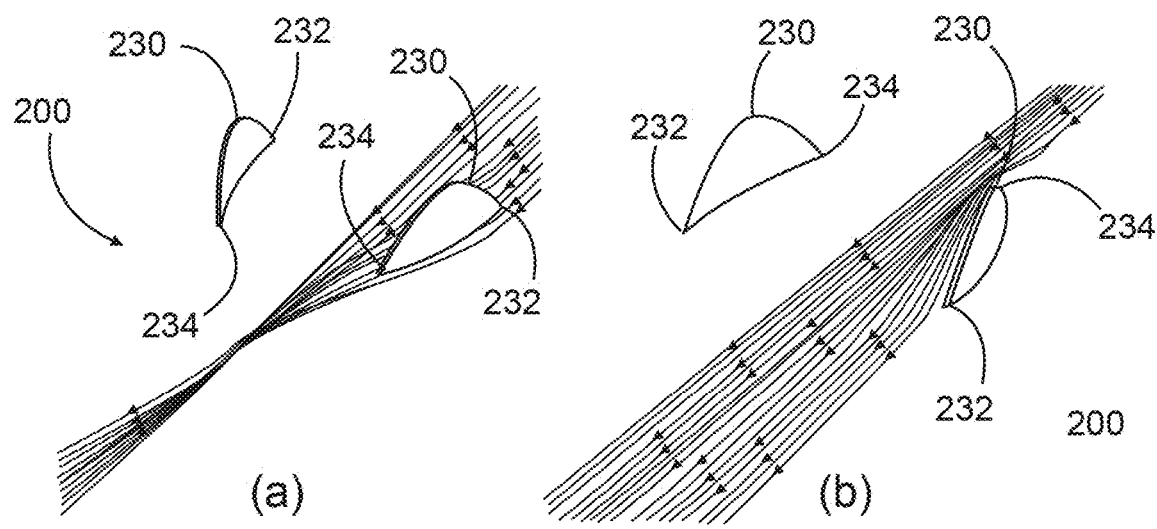
FIG. 6 shows schematically and exemplarily flow representations in the case of vortex generators according to an embodiment of the disclosure.

FIG. 6 shows schematically and exemplarily flow lines on a cambered vortex generator 200 in the case of nominal incident flow, FIG. 6(a), and rearward incident flow, FIG. 6(b). The camber of the fins 230 means that the fin chord of the fins 230 does not correspond to the direct connection of the two ends 232 and 234 but deviates from it.

Figure 7:
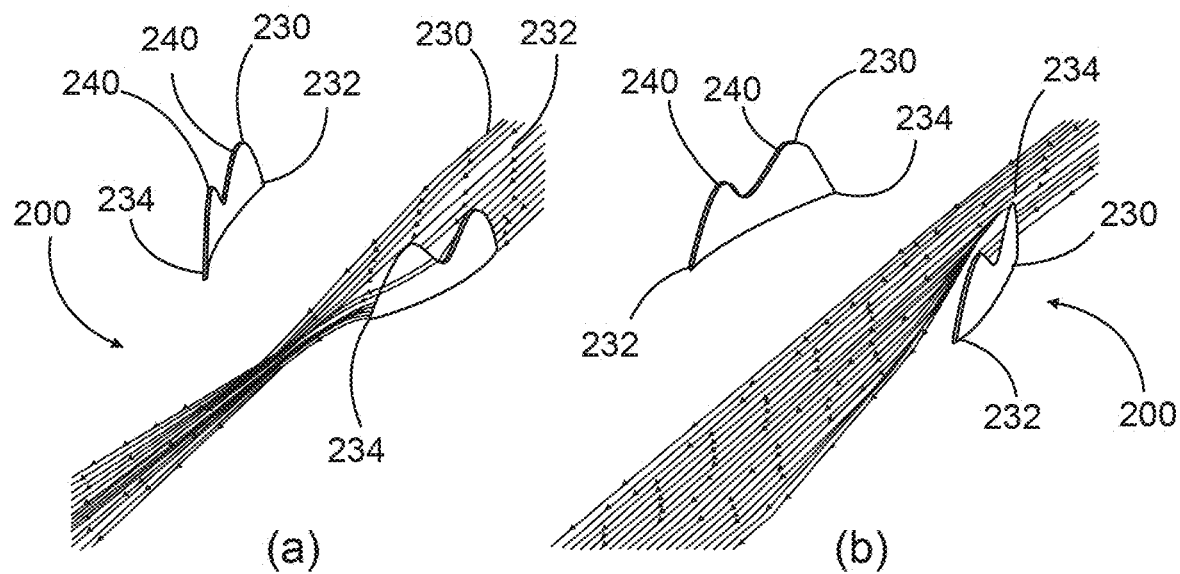
FIG. 7 show schematically and exemplarily flow representations in the case of vortex generators according to an embodiment of the disclosure.

In addition, this asymmetry effect can be enhanced if, as shown in FIGS. 7(a) and (b), respectively, the upper edge of the vortex generator 200 is provided with one or more recesses between multiple tips 240, through which a flow balance is achieved upstream of the leeward region in each case. In doing so, each of the geometry regions on the leeward side is supported in its effect by the supply of undisturbed flow.

This effect is also exemplarily shown in the table below for the comparison of the asymmetric effect of the geometric measures at the vortex generator 200. Here, for the exemplarily selected geometries, a significant increase in the difference in the vorticity, as required for the ViV suppression by a ring or helix arrangement, is recognizable in each case. The vortex generators 200 in the exemplary evaluation are selected here such that they match in terms of size.

| Vortex generator shape | Maximum vorticity X [1/s]) in the wake at nominal incident flow (0°) | Maximum vorticity X [1/s]) in the wake at reverse incident flow (180°) | Ratio of vorticity 0°/180° |
|---|---|---|---|
| Flat rectangular VG according to literature | 58.1 | 55.1 | 1.05 |
| Flat triangular VG according to literature | 41.0 | 35.6 | 1.15 |
| Cambered VG 200 according to FIG. 3(a) | 28.9 | 12.7 | 2.27 |
| Cambered VG with 2 tips | 39.9 | 14.6 | 2.72 |

In an annular arrangement, the distance between the rings is between 50% and 400% of the tower diameter (0.5D to 4D), with the particularly preferred range being about 2D.

The number of vortex generators 200 in a ring is preferably six or more, preferably a number divisible by four, and particularly eight. The rings with respect to each other can be twisted or aligned in the same way.

The number of helixes, their pitch, as well as the number of vortex generators 200 per gradation are adjustable. A combined arrangement results in a special case of the helix with a finite extent of preferably two vortex generators 200. The occupancy of the surface area by vortex generators 200 can be described by the distance from uppermost to lowermost vortex generator 200, as well as by the surface area occupied by vortex generators 200.

The size of the vortex generators 200 is preferably described relative to the diameter (1% D to 5% D, sweet spot according to current study at 2%).

The camber of the vortex generators 200 is preferably specified relative to the size of the vortex generators 200. Here, a camber of at least 1%, in relation to the fin chord of the fins 230, has been found to be advantageous. Particularly preferably, the camber is at least 2% and in particular at least 3% of the fin chord of the fins 230.

Also, a number of tips 240 greater than one has been found to be advantageous.

Figure 8:
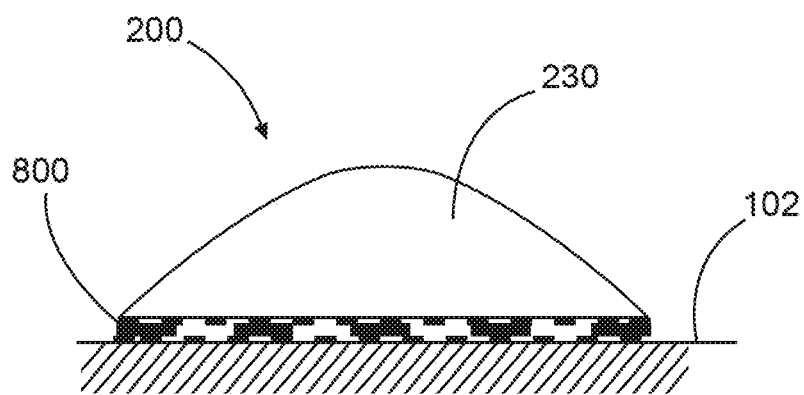
FIG. 8 shows schematically and exemplarily a side view of a vortex generator with base.
Figure 9:
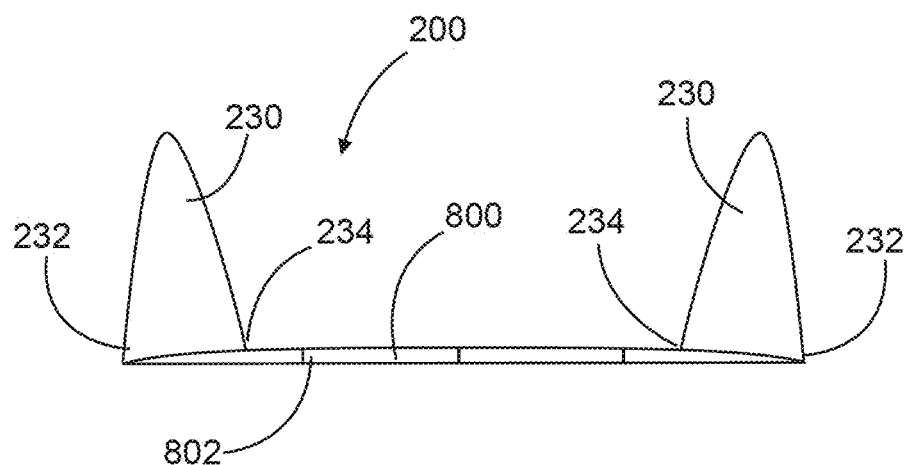
FIG. 9 shows schematically and exemplarily a vortex generator with base in a front view.

FIG. 8 shows a vortex generator 200 in side view and FIG. 9 shows the vortex generator 200 in a view in incident flow direction. In this example, the vortex generator 200 has a common base 800 that connects the two fins 230 and is prepared for mounting the two fins 230 together on the tower 102.

Double-sided adhesive tape having an adhesive layer and/or a foam layer can be arranged between the vortex generator 200 and the tower 102, for example. A leading edge 802 of the base 800 is also an obstruction to airflow, and thus can be referred to in its effect as a "lower fin" since the leading edge 802 also contributes to vortex generation.

Figure 10:
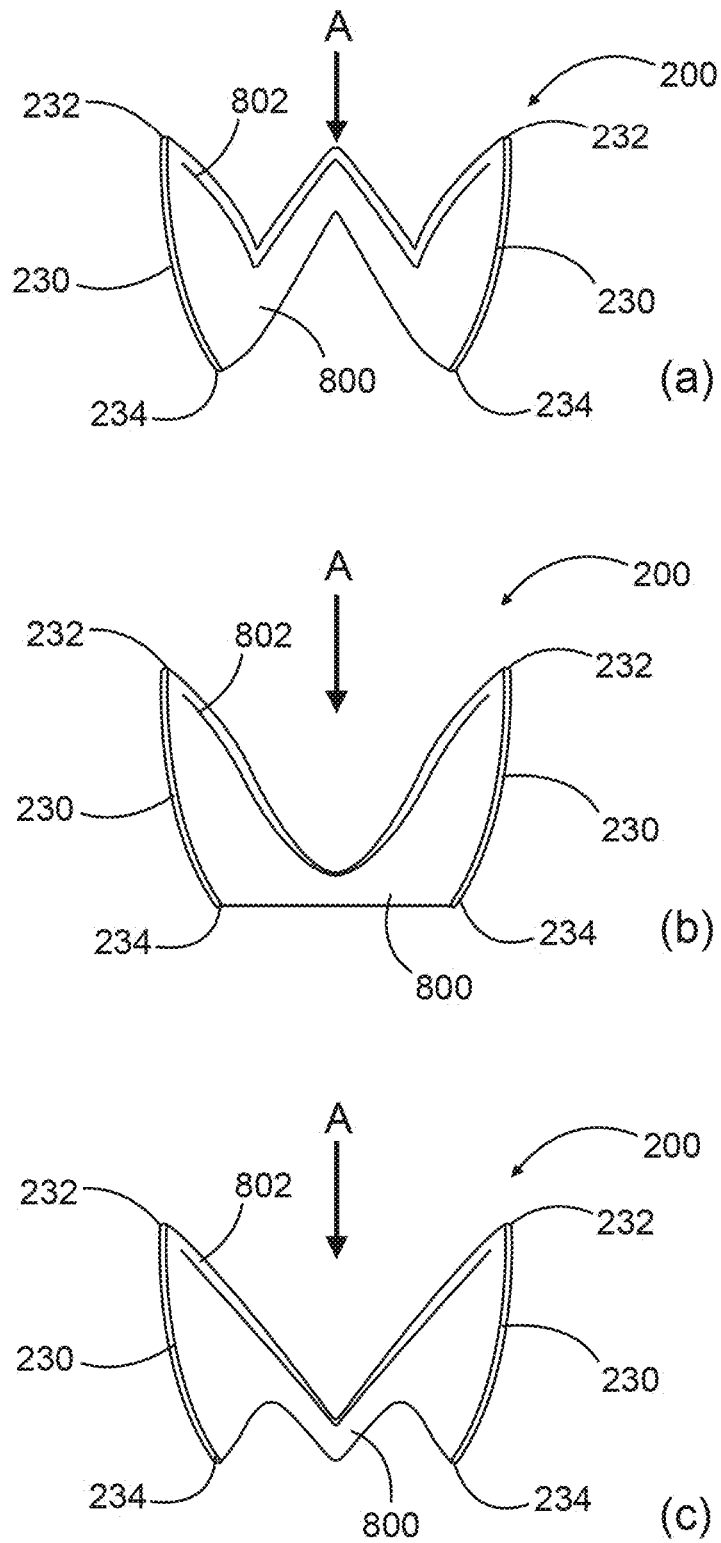
FIG. 10 shows schematically and exemplarily vortex generators with a different base in a top view.

FIG. 10 shows plan views of different geometries of bases 800, with FIG. 10(a) showing a plan view of a W-shaped base 800, FIG. 10(b) showing a U-shaped base 800, and FIG. 10(c) showing a V-shaped base 800. It can be seen that the leading edges 802 formed in each case are not perpendicular to the nominal incident flow direction A, but are formed at a relatively large angle thereto. As an alternative to the "U"-, "V"- and "W"-shaped bases shown, it is also conceivable to have, for example, an "H"-shaped base which is formed similarly to the "U"-shaped base but has the connection between the two fins in the middle rather than at the rear end.

One or more embodiments reduce vortex-induced transverse (ViV) vibrations on wind turbine towers. These are exposed to the risk of resonance both during installation and during spin states, which can be reduced or prevented by the techniques described herein. If such a resonance case occurs, excessive vibration amplitudes can occur, posing a risk to personnel involved in installation or service and to the structural integrity of the turbine.

Embodiments can be applied to all structures and conditions affected by the ViV phenomenon. This includes in particular building structures such as towers, chimneys, bridge piers, etc., and installations such as antennas, masts or tension cables. Likewise, a transfer to the field of maritime applications such as submarine cables, foundations of offshore wind turbines, tidal and wave energy plants or maritime platforms is possible.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wind turbine comprising:
a tower, a nacelle arranged on the tower, a generator, and a rotor comprising at least one rotor blade, and
a plurality of vortex generators arranged on an outer surface of the tower,
wherein each of the plurality of vortex generators has at least one fin extending from an outer surface of the tower,
wherein each fin has a height extending perpendicularly from the outer surface of the tower and a fin chord extending parallel to the outer surface of the tower,
wherein the fin chord has a curvature such that a first end of the fin chord has a smaller angle to a horizontal than the opposite second end of the fin chord,
wherein the curvatures of the fin chords of the plurality of vortex generators are oriented the same relative to a circumferential direction around the outer surface of the tower, and
wherein the plurality of vortex generators are configured such that asymmetrically strong wake vortices caused by the plurality of vortex generators cause a central wake vortex in the near-field of the tower to rotate in a preferred direction of rotation.

2. The wind turbine according to claim 1, wherein the curvature of the fin chord is not equal to 0 over its entire course.

3. The wind turbine according to claim 1, wherein each of the at least one fins extend at an angle of at least 80° to the outer surface of the tower.

4. The wind turbine according to claim 1, wherein the at least one fins of each of the plurality of vortex generators have a height of between 0.5% and 5% of the diameter of the tower at the location of the respective vortex generator.

5. The wind turbine according to claim 1, wherein the plurality of vortex generators are arranged annularly in a plane around the tower, wherein the plurality of vortex generators are evenly spaced from each other in the plane.

6. The wind turbine according to claim 1, wherein plurality of vortex generators are arranged helically around the tower.

7. The wind turbine according to claim 1, wherein multiple planes of vortex generators are arranged along the height direction of the tower, wherein the multiple planes have a distance from each other in a vertical direction which is between one and three times the tower diameter.

8. The wind turbine according to claim 7, wherein at least three planes of vortex generators are arranged along the height direction of the tower, wherein the distance between two of the planes is smaller than between the further ones of the planes.

9. The wind turbine according to claim 1, wherein the fin chord has a curvature such that the vortex generator allows deflection of the flow passing the surface of the tower in the transverse direction of the tower.

10. The wind turbine according to claim 1, wherein each of the vortex generators comprise two fins with a base arranged therebetween.

11. The wind turbine according to claim 10, wherein the two fins of the respective vortex generators have opposite curvatures such that tangents through the first ends of the two fins do not intersect or intersect at a smaller angle than tangents through the opposite second ends of the two fins.

12. The wind turbine according to claim 10, wherein each of the vortex generators are mounted to the outer surface of the tower such that a centerline between the two fins is substantially horizontal.

13. The wind turbine according to claim 10, wherein a front half along the fin chord of a lateral surface of each of the two fins, starting from the first end, is smaller than a rear half of the surface.

14. The wind turbine according to claim 10, wherein the base has at most 90% of the surface area between the fin chords of the fins, wherein the base has a shape that is at least one of U-shaped, V-shaped, W-shaped, or H-shaped.

15. The wind turbine according to claim 1, wherein the plurality of vortex generators are arranged such that the flow deflection takes place substantially independently of the wind direction.

16. The wind turbine according to claim 1, wherein the plurality of vortex generators are connected to the outer surface of the tower by an adhesive, wherein the adhesive has a thickness between 1 mm and 4 mm.

17. A vortex generator comprising a curved fin chord for use on the tower of the wind turbine according to claim 1.

18. A method for arranging or retrofitting a plurality of vortex generators on the wind turbine according to claim 1.

\* \* \* \* \*